United States Patent
Saha et al.

(10) Patent No.: US 12,073,096 B2
(45) Date of Patent: Aug. 27, 2024

(54) HOLISTIC WAY OF CLOUD CONNECTOR INTEGRATION ON EXISTING ON-PREMISE PRODUCT

(71) Applicant: SAP SE, Walldorf (DE)

(72) Inventors: Rajib Saha, Siliguri (IN); Venkata Ramana Murthy K, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/337,977

(22) Filed: Jun. 20, 2023

(65) Prior Publication Data

US 2023/0333753 A1 Oct. 19, 2023

Related U.S. Application Data

(63) Continuation of application No. 17/546,441, filed on Dec. 9, 2021, now Pat. No. 11,726,673.

(51) Int. Cl.
*G06F 3/06* (2006.01)

(52) U.S. Cl.
CPC .......... *G06F 3/0622* (2013.01); *G06F 3/0655* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 11,416,298 B1 * | 8/2022 | Barker, Jr. | G06F 3/061 |
| 2015/0067171 A1 * | 3/2015 | Yum | H04L 67/562 709/226 |
| 2015/0121375 A1 * | 4/2015 | Balasubramanyam | G06F 8/61 718/1 |
| 2017/0093867 A1 * | 3/2017 | Burns | H04L 63/107 |
| 2021/0173811 A1 * | 6/2021 | Agrawal | G06F 11/1461 |
| 2022/0019367 A1 * | 1/2022 | Freilich | G06F 3/067 |
| 2022/0191185 A1 * | 6/2022 | Carmon | H04L 9/3213 |
| 2023/0037199 A1 * | 2/2023 | Holzman | H04L 41/0843 |
| 2023/0185462 A1 | 6/2023 | Saha et al. | |

* cited by examiner

*Primary Examiner* — Edward J Dudek, Jr.
*Assistant Examiner* — Ralph A Verderamo, III
(74) *Attorney, Agent, or Firm* — Sterne, Kessler, Goldstein & Fox P.L.L.C.

(57) ABSTRACT

Disclosed herein are system, method, and computer program product embodiments for utilizing non-RAM memory to implement a cloud storage system. An embodiment operates by receiving a request from an on-premises computer system to securely access a cloud drive by receiving an object specific template for an object. Based on the object specific template, an object specific plugin is selected, wherein the object specific plugin is configured to provide a connection to a cloud-based repository to obtain real time data for the object. An instance of the object is generated and communicated to a cloud plugin, wherein the cloud plugin is configured to communicate to a specific cloud drive through an HTTP client and further upload the instance of the object to the specific cloud drive.

20 Claims, 4 Drawing Sheets

US 12,073,096 B2

HOLISTIC WAY OF CLOUD CONNECTOR INTEGRATION ON EXISTING ON-PREMISE PRODUCT

CROSS-REFERENCE TO RELATED APPLICATIONS

This application is a continuation of U.S. Non-Provisional patent application Ser. No. 17/546,441, filed Dec. 9, 2021, the contents of which are incorporated herein by reference in its entirety.

BACKGROUND

There are many on-premises software products that have been operating for many years. However, companies are moving toward a cloud-based infrastructure. Because of various limitations of on-premises products because monolithic architecture users/organizations may not be able migrate these systems directly to the cloud.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for an on-premises system connecting to a cloud storage infrastructure, according to some embodiments.

In some embodiments, the technology described herein provides for a hybrid system for an on-premises software product. For example, some on-premises software products have multiple levels of user access rights for different operations performed by the on-premises software product. Therefore, in some embodiments, the hybrid system may keep documents organized within their own user cloud storage drives. These cloud storage drives may be used from anywhere, at any time.

In some embodiments, the technology described herein provides an implementation of a "Cloud Plugin" and "HTTP Client" for on-premises software products. Hypertext Transfer Protocol (HTTP) is an application-layer protocol for transmitting hypermedia documents, such as HTML. HTML (HyperText Markup Language) defines the meaning and structure of web content. This implementation may communicate on-premises generated artifacts to different cloud storage drives. In some embodiments, the cloud plugin may be implemented as a plugin module, which is operative with any cloud destination. This plugin module may be responsible for validating an on-premises user for admin level permission for communicating an artifact to the cloud storage drives.

In some embodiments, the "HTTP Client" may be implemented as a thin-client module used by the cloud plugin module to use a specific API to upload a report. This thin-client module may, in some embodiments, be used to download/access a report from cloud drives as well.

In some embodiments, the cloud plugin module communicates with the cloud storage drives to check authentication and authorization of the user requesting the operation. As will be described in greater detail herein, there are multiple security elements involved in the process to transfer an on-premises report to a cloud storage drive from an on-premises software product.

Figure 1:
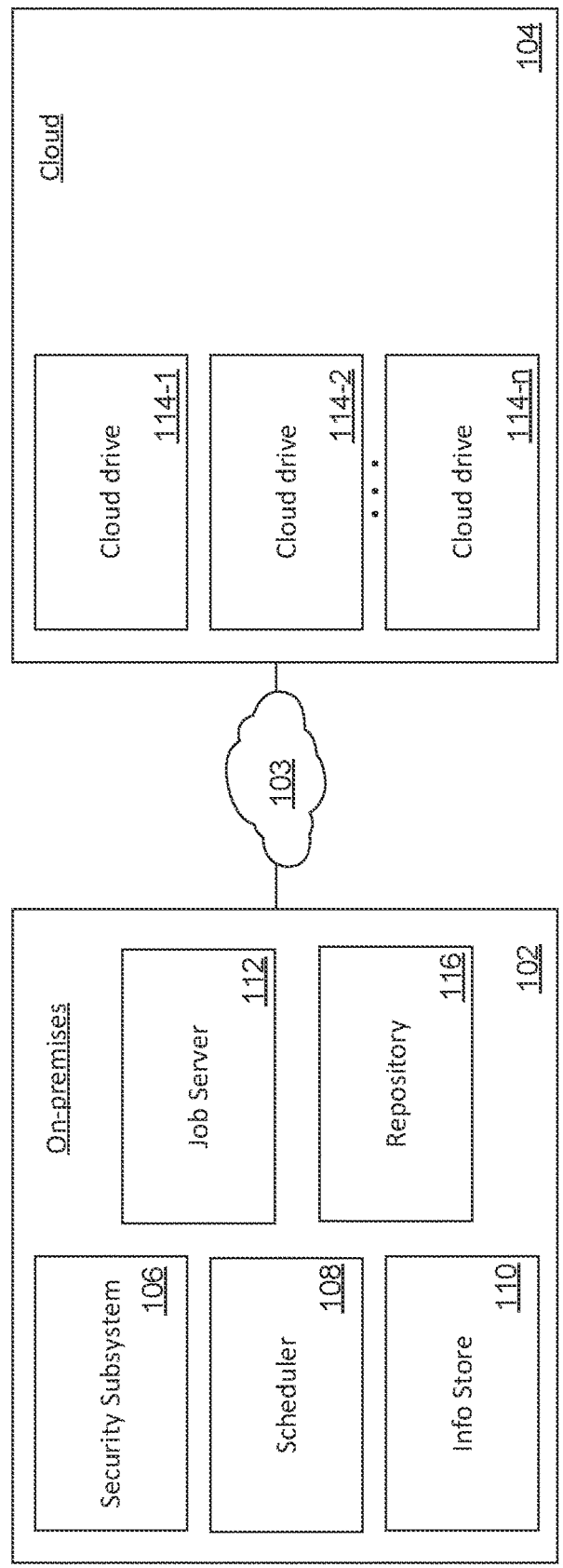
FIG. 1 is a block diagram of an on-premises system that includes a cloud integration, according to some embodiments.

FIG. 1 is a block diagram of a cloud-based system 100 that includes on-premises data input mechanisms, according to some embodiments. System 100 may be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all modules may be needed to perform the disclosure provided herein. Further, some of the processes described may be performed simultaneously, or in a different order or arrangement than shown in FIG. 1, as will be understood by a person of ordinary skill in the art.

System 100 shall be described with reference to FIG. 1. However, system 100 is not limited to this example embodiment. In addition, system 100 will be described at a high level to provide an overall understanding of flow of data from an on-premises platform to a cloud platform. Greater detail will be provided in the figures that follow.

On-premises system 102 is capable of processing data inputs to on-premises software platforms to include, but not limited to, enterprise systems such as Business Objects Enterprise (BOE). BOE® is a known core reporting and analysis enterprise software suite. This software platform is used as primary access to publish, store, create and share reports and to perform analysis within the different products. While described in this disclosure for a reporting function, the technology described herein may be applicable for any software functionality (e.g., data processing, storage/retrieval, reporting, upgrades, updates, etc.) between an on-premises system and a cloud-based system.

In some embodiments, on-premises system 102 may be configured as one or more separate or interconnected computing devices. These computing devices may include, but are limited to, a server device, a plurality of interconnected server devices, a mobile device (e.g., smartphone, tablet, laptop, wearable device, etc.) or display devices, although other devices capable of processing data are contemplated without departing from the scope of the technology described herein. For example, on-premises system 102 may be configured to include user interfaces for data entry/output. Data input user interfaces (UI) may render various graphical user interfaces, such as a data entry templates.

Security subsystem 106 may be configured to provide a security check for a BOE user to have specific access to one or more features of the BOE platform. In a non-limiting example, security system 106 may provide a security check for report level access for data stored on-premises within local computer storage (e.g., info store 110).

Info-store 110 provides storage software objects (e.g., BOE platform objects). In a non-limiting example, these BOE objects may include, but are not limited to, reports, users, connections, etc., represented as info-objects. Info-objects take information from the source, then adjust and arrange the information into either a standard or customized report. In one non-limiting example, info-objects provide information about the business (e.g., on-premises). For instance company 'XYZ' is interested in finding out how much of "product x" shipped on "date x" to "factory x". By defining an info-object for specific function, such as "0MATERIAL", "0DATE" and "0LOCATION", the information can be retrieved. Info-objects may also be classified into types, such as, characteristics (e.g., customers), key figures (e.g., revenue), units (e.g., currency, amount unit), time characteristics (e.g., fiscal year) or technical characteristics (e.g., request number), to name a few.

Scheduler 108 provides time or batch based scheduling. For example, a user of on-premises system 102 desires to schedule a report and subsequent storage. First, the request would be provided to security subsystem 106 to check if the user has access privilege to the report. On successful validation, the request is provided to scheduler 108 to provide necessary information for scheduling the report, such as, hourly, daily, weekly, monthly or on specific date. It also shares information associated with a communication protocol or destination for the report such as, but not limited to, File Transfer Protocol (FTP), Secure File Transfer Protocol (SFTP), Fiber To The Premises (FTTP), extensible markup language (XML), email, BI (Business intelligence) inbox, webpage, presentation software, etc.

Job server 112 processes scheduled actions on objects that are a subject of the request. In a non-limiting example, when a user adds a BOE action to job server 112, the job server may be configured to process reporting or document objects as well as communicate objects or reports to specified destinations. In another non-limiting example, job server 112 may receive processing requests from other on-premises servers (e.g., a Central Management Server (CMS)), not shown.

Repository 116 may be configured to store and supply raw data, indexed data, structured data, template data, report data or other known configurations as is known.

In some embodiments, the reporting or document objects may be delivered via a network 103 and associated with a network-enabled data input program/application. Network 103 may include one or more wired and/or wireless networks. For example, network 103 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network and/or a combination of these or other types of networks.

On-premises system 102 and cloud system 104 may each be configured with an input/output interface (FIG. 4, 420)) to communicate data/instructions to/from on-premises system 102 over network 103, to/from cloud system 104. On-premises system 102 may retrieve, receive, display, edit and store information generated from the local application or communicated via network 103.

Cloud system 104 may be configured with one or more cloud drives 114 (1-n) to store one or more data sets (e.g., reports) of the technology described herein. In a non-limiting example, cloud system 104 may be configured as a data center with computer servers that physically store the data on one or more cloud drives 114 (1-n), with the data available to on-premises system 102 through network 103. In another non-limiting example, cloud system 104 may be configured as a distributed storage system (one or more cloud drives 114 (1-n)) with interconnected storage locations configured on-site or geographically distributed. The technology described herein provides on-premises storage and retrieval functionality for cloud drives 114 (1-n) that allows users to remotely upload their content (e.g., reports), store them and retrieve the same data as and when required. As previously described, the technology described is not limited to reporting functionality, but may be applicable for any software functionality (e.g., data processing, storage/retrieval, reporting, upgrades, updates, etc.) between an on-premises system and a cloud-based system.

Based on the teachings contained in this disclosure, it will be apparent to persons skilled in the relevant art(s) how to make and use embodiments of this disclosure using data processing devices, computer systems and/or computer architectures other than that shown in FIG. 1. In particular, embodiments can operate with software, hardware, and/or operating system implementations other than those described herein.

Figure 2:
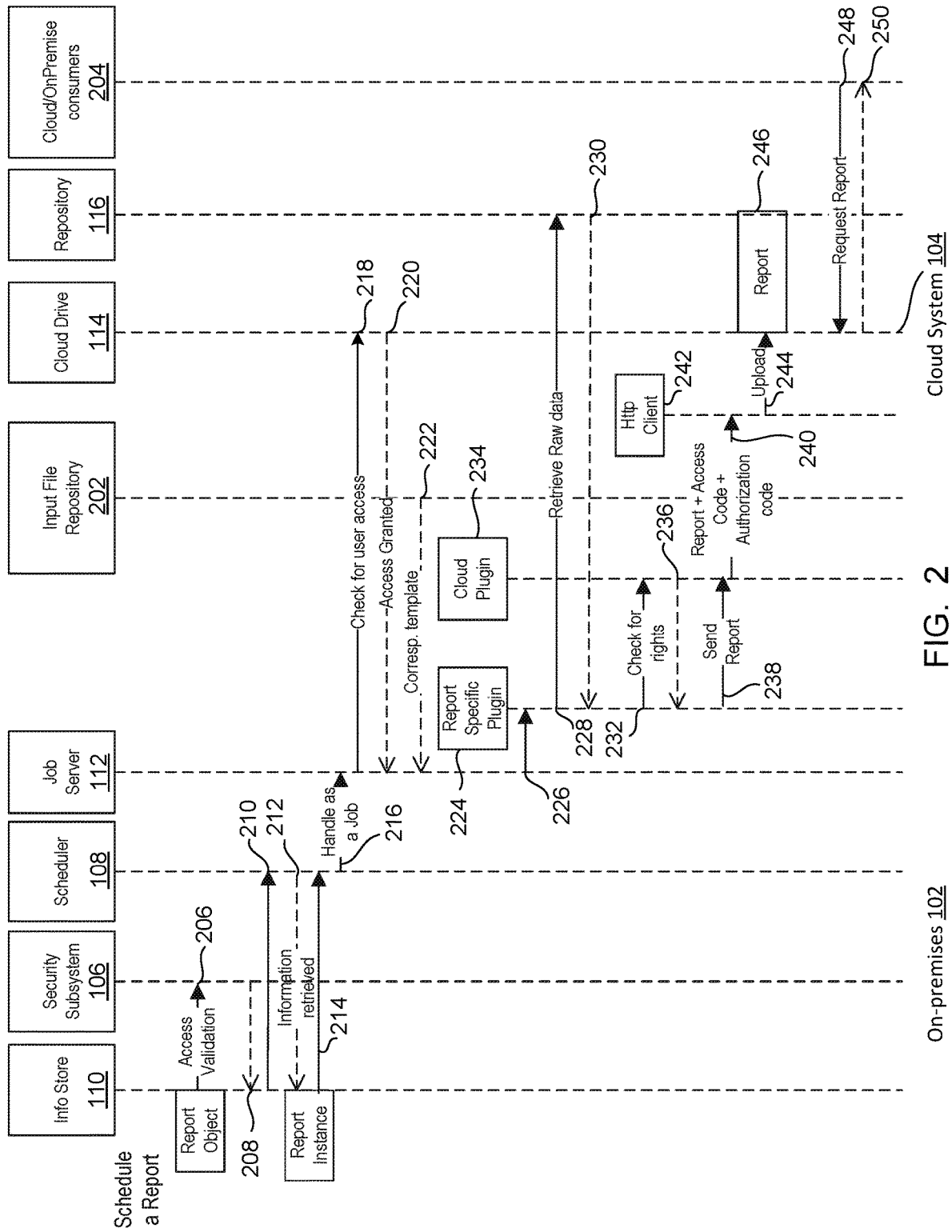
FIG. 2 is a flow diagram of an on-premises system connecting to a cloud system, according to some embodiments.

FIG. 2 is a flowchart for an on-premises system operation with a cloud storage infrastructure, according to an embodiment. FIG. 2 may be performed by processing logic that can comprise hardware (e.g., circuitry, dedicated logic, programmable logic, microcode, etc.), software (e.g., instructions executing on a processing device), or a combination thereof. It is to be appreciated that not all steps shown may be needed to perform the disclosure provided herein. Further, some of the steps may be performed simultaneously, or in a different order than shown in FIG. 2, as will be understood by a person of ordinary skill in the art.

As shown, on-premises system 102 is configured to communicate with a cloud storage infrastructure (cloud system 104), according to an embodiment. On-premises system 102 may retrieve, receive, display, edit and store information (e.g., data, reports, etc.) generated from a local application or delivered/retrieved via network 103. Cloud system 104 is configured with one or more cloud drives 114 (1-n). An input file repository 202 may be configured on-premises or as a service to distribute shared files and objects as is known in the art. Cloud and on-premises consumers 204 are designated in the workflow for requesting/receiving a selected report. For example, once a report is scheduled and stored in a user specific cloud drive 114, consumers (i.e., users) from both sides (on-premises/cloud) may request access to the report.

For illustrative purposes, the flow diagram shown in FIG. 2, may be based on a BOE product architecture. In this non-limiting embodiment, an example scheduling of a BOE specific report includes communicating the completed report to a cloud drive. As previously described in FIG. 1, objects, such as reports, users, connections, are represented as Info Objects and the computer storage where the Info Objects are stored is called an Info Store 110. However, the technology described herein is not limited thereto. One skilled in the art will appreciate that other software platforms, tasks, objects, storage designations and security measures may be substituted herein without departing from the scope herein.

At a high level, the workflow may be configured with a cloud plugin 234 and HTTP client 242 to coordinate access/storage of an on-premises report in a cloud drive 114. Various security checks may be performed for the BOE user to have access to a specific report. If the report level access is there, then a check is performed for the user to have access to a cloud drive account. Upon validating the access for the cloud drive, validation continues to determine if the BOE user has a BOE level permission for accessing the specific cloud drive from BOE. On receiving permission for BOE to communicate a report to the specific cloud drive, cloud access code(s) and authorization code(s) are passed to the cloud drive to identify the genuine user for the BOE artifact and provide storage/access to the cloud drive.

To schedule a report to be instantiated (e.g., report object instance) and subsequent stored in cloud drive 114, a request 206 is communicated to security subsystem 106 to check (e.g., validate) if the user has access privilege to the report object. Upon a successful validation 208, a request 210 is communicated to scheduler 108 to provide scheduling timing information (e.g., hourly, daily, weekly, monthly or on specific date). It also may share what kind of destination to set for the report, such as, SFTP, email, BI inbox, etc.

Upon receiving the scheduling timing and kind information 212, a report instance 214 is communicated to the scheduler 108 to follow the schedule as a job 216 with a child thread to execute the job (report instance) on time.

For a given cloud destination (e.g., server farm), scheduler 108 checks 218 with the cloud drive 114 for user access approval. If the user has access to the cloud drive, access is granted 220 by providing an access code. Access codes may be implemented as an access token that applications may use to make API requests on behalf of the requestor. The access token represents an authorization of a specific application to access specific parts of a user's data.

Upon successful receiving the access code, input file replication 202 provides a specific template 222 (e.g., WebI®, Crystal reports®, etc.) for the report. Based on a report type, the job server 112 connects 226 to a corresponding report specific plugin 224 (e.g., a WebI plugin, Crystal reports plugin, etc.). The report specific plugin 224 connects 228 to an actual customer repository 116 (e.g., Online Transaction Processing (OLTP), relational database, etc.) to obtain real time raw data 230 (e.g., transactional) needed to generate the specific report.

The report specific plugin 224 subsequently checks 232 for user access rights with a cloud plugin 234 (e.g., Google Drive Plugin, etc.). If the user has privilege 236 (cloud plugin 234 returns authorization code) to communicate BOE generated report to cloud drive 114, it communicates 238 the report to cloud plugin 234 to further send to a specific cloud drive associated with the user. Cloud plugin 234 first communicates the report to HTTP client 242, with (access code and authorization code) 240 for further action to communicate (upload) 244 the report 246 to cloud drive 114. HTTP client 242 will generate the proper formatted packet to communicate the report 246 to the specific cloud drive validated for the user. Once the report is stored to the cloud drive, the user or another authorized person (e.g., cloud or on-premises consumer 204) can request 248 and receive 250 the report 246 from the specific cloud drive.

FIG. 2 flow diagram illustrates a series of different levels of security checks involved in the process to use the cloud plugin and HTTP client for communicating an artifact from the on-premises BOE product to a cloud drive. In some embodiments, the technology described herein provides functionality (e.g., reports) between a very secured on-premises BOE product and a different, highly protected cloud drive, in very seamlessly way.

Figure 3:
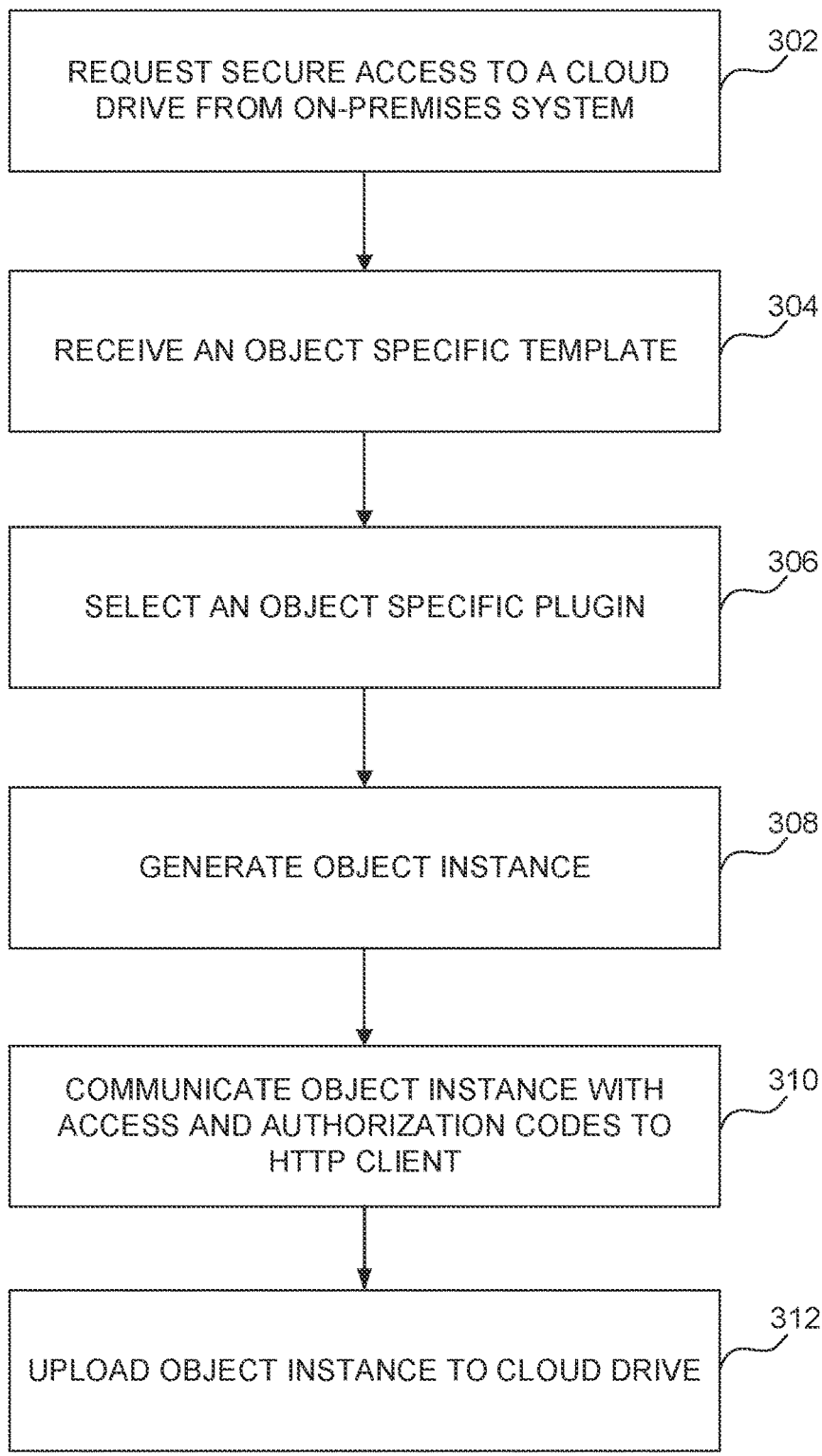
FIG. 3 is a flowchart of an on-premises system connecting to a cloud system, according to some embodiments.

FIG. 3 is a flowchart for a method 300 for an on-premises system connecting to a cloud storage infrastructure, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 2. However, method 300 is not limited to that example embodiment.

In 302, on premises system 100 receives a request to securely access a cloud drive. The request may be implemented with a number of security functions. For example, the on-premises computer system checks to see if a requester (i.e., user) has access privileges to a report object and a cloud drive. Upon successful validation, scheduling timing information (e.g., hourly, daily, weekly, monthly or on specific date and destination type are obtained to generate a report instance according to the schedule. If the user has access to the cloud drive, access is granted by providing an access code.

In 304, on-premises system 102 receives an object specific template (e.g., a specific template for a report). For example, the object specific template may be for a report instance (object instance) and the template retrieved from an input file replication service.

In 306, on-premises system 102 selects, based on the object specific template, an object specific plugin (e.g., report plugin). The report specific plugin may implement a connection to a customer repository (e.g., on-premises) to obtain real time raw data needed to generate the report.

In 308, on premises system 102 generates the object instance (e.g., report incorporating the raw data).

In 310, if the user has privilege to communicate the generated object instance (e.g., report incorporating the raw data) to a cloud drive, on-premises system 102 communicates the object instance to the cloud plugin to communicate to the specific cloud drive. Cloud plugin communicates the object instance to a HTTP client, with an access code and an authorization code.

In 312, on-premises system 102 communicates (uploads) the object instance to the cloud drive. The HTTP client will generate a proper formatted packet to communicate the object instance to the specific cloud drive validated for the user.

Once the object instance (report) is stored to the cloud drive, the user or another authorized person can request and receive the report from the specific cloud drive validated for the user.

Benefits

The various embodiments described provide an improvement to the computer system itself by no longer restricting on-premises software to functionality within an on-premises computer boundary. The described "hybrid" system can retain and organize documents with user specific cloud drives. These specific cloud drives may be used from anywhere or at any time. With this technology, an organization's internal storage/processing platform will be configured to migrate to off-premises cloud based platforms and products.

The various embodiments described provide a new type of cloud drive that may independently support various known and future cloud drive systems.

Figure 4:
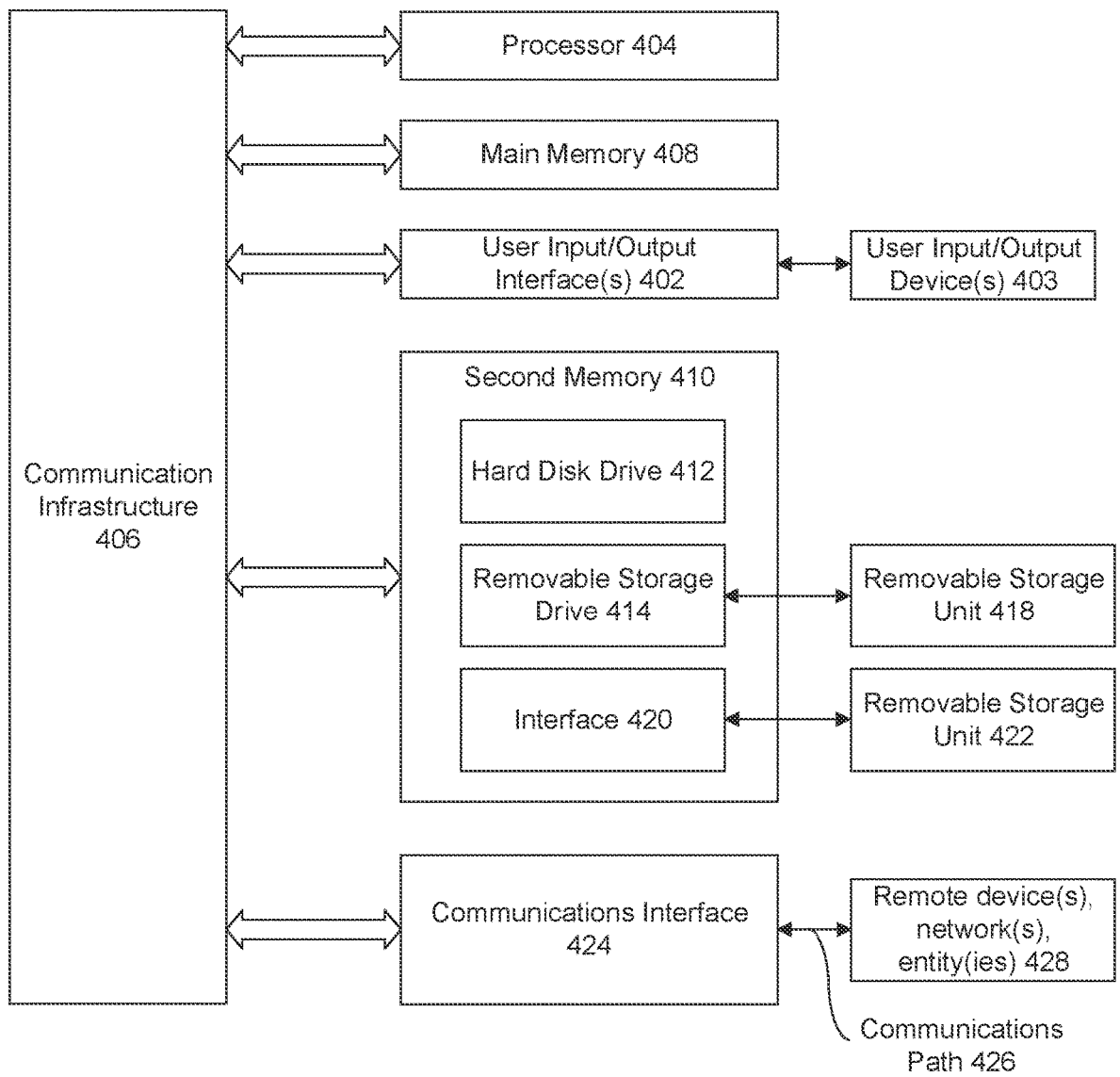
FIG. 4 is an example computer system useful for implementing various embodiments.

Various embodiments can be implemented, for example, using one or more computer systems, such as computer system 400 shown in FIG. 4. Computer system 400 can be used, for example, to implement method 300 of FIG. 3. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device 414. Removable storage drive 414 may be a floppy disk drive, a magnetic tape drive, a compact disk drive, an optical storage device, tape backup device, a cloud drive and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A hybrid storage system for an on-premises software product, comprising:
a memory; and
at least one processor coupled to the memory and configured to:
assign, based on multiple levels of user access rights, a plurality of cloud storage drives for document storage operations performed by the on-premises software product;
access a first cloud storage drive of the plurality of cloud storage drives, wherein to access the first cloud storage drive, the at least one processor is configured to:
select an object specific plugin, wherein the object specific plugin is configured to provide an object to a cloud-based repository containing the first cloud storage drive;
communicate, based on user authorization, an instance of the object to a cloud plugin, wherein the cloud plugin is configured to communicate to the first cloud storage drive through a thin-client module; and
communicate the instance of the object with the first cloud storage drive.

2. The hybrid storage system of claim 1, wherein the thin-client module is operative with the cloud plugin to select a specific Application Programming Interface (API).

3. The hybrid storage system of claim 1, wherein the thin-client module comprises a Hypertext Transfer Protocol (HTTP) Client.

4. The hybrid storage system of claim 1, wherein the thin-client module is operative with the cloud plugin to select a specific Application Programming Interface (API) to upload, download or access a report.

5. The hybrid storage system of claim 1, wherein the at least one processor is further configured to:
check for access privileges for a requester to the instance of the object and the first cloud storage drive, wherein the access privileges comprise at least an access code and an authorization code.

6. The hybrid storage system of claim 5, wherein the at least one processor is further configured to:
communicate the instance of the object to the cloud plugin with the access code and the authorization code.

7. The hybrid storage system of claim 1, wherein the at least one processor is further configured to:
retrieve an object specific template from an input file repository.

8. The hybrid storage system of claim 1, wherein the at least one processor is further configured to:
generate, by the thin-client module, a formatted packet to upload the instance of the object to the specific cloud drive.

9. A computer-implemented method for accessing a cloud storage drive, comprising:

assigning, based on multiple levels of user access rights, a plurality of cloud storage drives for document storage operations performed by an on-premises software product;
accessing a first cloud storage drive of the plurality of cloud storage drives, the accessing comprising:
selecting an object specific plugin, wherein the object specific plugin is configured to provide an object to a cloud-based repository containing the first cloud storage drive;
communicating, based on user authorization, an instance of the object to a cloud plugin, wherein the cloud plugin is configured to communicate to the first cloud storage drive through a thin-client module; and
communicating the instance of the object with the first cloud storage drive.

10. The computer-implemented method of claim 9, wherein the thin-client module is operative with the cloud plugin to select a specific Application Programming Interface (API).

11. The computer-implemented method of claim 9, wherein the thin-client module comprises a Hypertext Transfer Protocol (HTTP) Client.

12. The computer-implemented method of claim 9, wherein the thin-client module is operative with the cloud plugin to select a specific Application Programming Interface (API) to upload, download or access a report.

13. The computer-implemented method of claim 9, wherein the user authorization comprises:
checking for access privileges for a requester to the instance of the object and the first cloud storage drive, wherein the access privileges comprise at least an access code and an authorization code.

14. The computer-implemented method of claim 13, further comprising:
communicating the instance of the object to the cloud plugin with the access code and the authorization code.

15. The computer-implemented method of claim 9, further comprising:
retrieving an object specific template from an input file repository.

16. The computer-implemented method of claim 9, further comprising:
generating, by the thin-client module, a formatted packet to upload the instance of the object to the specific cloud drive.

17. A non-transitory computer-readable device having instructions stored thereon that, when executed by at least one computing device, cause the at least one computing device to perform operations comprising:
assigning, based on multiple levels of user access rights, a plurality of cloud storage drives for document storage operations performed by an on-premises software product;
accessing a first cloud storage drive of the plurality of cloud storage drives, the accessing comprising:
selecting an object specific plugin, wherein the object specific plugin is configured to provide an object to a cloud-based repository containing the first cloud storage drive;
communicating, based on user authorization, an instance of an object to a cloud plugin, wherein the cloud plugin is configured to communicate to the first cloud storage drive through a thin-client module; and communicating the instance of the object with the first cloud storage drive.

18. The non-transitory computer-readable device of claim 17, wherein the thin-client module is operative with the cloud plugin to select a specific Application Programming Interface (API).

19. The non-transitory computer-readable device of claim 17, wherein the thin-client module comprises a Hypertext Transfer Protocol (HTTP) Client.

20. The non-transitory computer-readable device of claim 17, wherein the thin-client module is operative with the cloud plugin to select a specific Application Programming Interface (API) to upload, download or access a report.

* * * * *